United States Patent
Liu et al.

(10) Patent No.: US 10,548,063 B1
(45) Date of Patent: Jan. 28, 2020

(54) CALL ADMISSION CONTROL FOR RELAY ACCESS NODES

(71) Applicant: Sprint Spectrum LP, Overland Park, KS (US)

(72) Inventors: Chunmei Liu, Great Falls, VA (US); Krishna Sitaram, Chantilly, VA (US); Hemanth Pawar, Brambleton, VA (US); Pratik Kothari, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 74 days.

(21) Appl. No.: 14/950,432

(22) Filed: Nov. 24, 2015

(51) Int. Cl.
*H04W 48/06* (2009.01)
*H04W 72/12* (2009.01)
*H04W 24/08* (2009.01)
*H04W 36/38* (2009.01)
*H04W 76/18* (2018.01)
*H04W 76/10* (2018.01)
*H04W 76/34* (2018.01)

(52) U.S. Cl.
CPC ....... *H04W 48/06* (2013.01); *H04W 72/1252* (2013.01); *H04W 24/08* (2013.01); *H04W 36/38* (2013.01); *H04W 76/10* (2018.02); *H04W 76/18* (2018.02); *H04W 76/34* (2018.02)

(58) Field of Classification Search
None
See application file for complete search history.

(56) References Cited

U.S. PATENT DOCUMENTS

| | | | |
|---|---|---|---|
| 6,529,499 B1* | 3/2003 | Doshi | H04L 12/4641 370/230 |
| 2003/0021288 A1* | 1/2003 | Hayashi | H04L 47/14 370/461 |
| 2003/0120705 A1* | 6/2003 | Chen | H04L 47/521 718/104 |
| 2003/0211848 A1* | 11/2003 | Rajkotia | H04W 36/0061 455/436 |
| 2004/0208126 A1* | 10/2004 | Wassew | H04L 47/10 370/235 |
| 2004/0208183 A1* | 10/2004 | Balachandran | H04L 47/10 370/395.21 |
| 2006/0002297 A1* | 1/2006 | Sand | H04L 47/15 370/235 |
| 2006/0019663 A1* | 1/2006 | Cuffaro | H04W 36/0061 455/436 |
| 2006/0117385 A1* | 6/2006 | Mester | G06F 21/552 726/22 |

(Continued)

*Primary Examiner* — Christopher T Wyllie (57) ABSTRACT

A wireless device or UE is configured to function as a relay on behalf of a donor access node. The relay UE performs call admission controls including balancing the resources of the relay access node with the resources provided by the donor access node providing services to end UEs via the relay access node, i.e. a backhaul connection of the relay UE. The backhaul throughput is compared to a throughput requirement of the end UEs being served by the relay UE. If the throughput requirement is larger than the backhaul throughput, any new connection requests from an additional end UE may be rejected. A threshold may be defined to ensure that there are ample resources at the backhaul prior to accepting connection requests from additional end UEs.

11 Claims, 5 Drawing Sheets

(56) References Cited

U.S. PATENT DOCUMENTS

| | | | | |
|---|---|---|---|---|
| 2007/0008929 A1* | 1/2007 | Lee | H04W 36/26 | 370/331 |
| 2007/0105563 A1* | 5/2007 | Ro | H04W 28/24 | 455/452.2 |
| 2008/0117810 A1* | 5/2008 | Stott | H04L 12/66 | 370/230 |
| 2010/0150336 A1* | 6/2010 | Chen | H04M 3/42272 | 379/265.02 |
| 2010/0271962 A1* | 10/2010 | Han | H04L 41/0896 | 370/252 |
| 2011/0149875 A1* | 6/2011 | Ahuja | H04L 47/72 | 370/329 |
| 2011/0207428 A1* | 8/2011 | Ueda | H04W 4/90 | 455/404.1 |
| 2011/0305137 A1* | 12/2011 | Chu | H04L 47/245 | 370/230 |
| 2012/0106383 A1* | 5/2012 | Gormley | H04L 1/0026 | 370/252 |
| 2013/0021962 A1* | 1/2013 | Hu | H04W 48/20 | 370/315 |
| 2013/0077472 A1* | 3/2013 | Tan | H04L 69/40 | 370/221 |
| 2013/0188551 A1* | 7/2013 | Rohit | H04W 76/10 | 370/315 |
| 2013/0258890 A1* | 10/2013 | Li | H04W 24/02 | 370/221 |
| 2013/0258942 A1* | 10/2013 | Rohit | H04L 67/14 | 370/315 |
| 2013/0336200 A1 | 12/2013 | Andreozzi et al. | | |
| 2014/0082212 A1* | 3/2014 | Garg | H04N 21/23439 | 709/233 |
| 2014/0254381 A1* | 9/2014 | Racz | H04L 47/14 | 370/235 |
| 2014/0334318 A1* | 11/2014 | Pica | H04W 36/14 | 370/252 |
| 2015/0055497 A1* | 2/2015 | Cheng | H04W 52/262 | 370/252 |
| 2015/0071248 A1* | 3/2015 | Faerber | H04W 36/0055 | 370/331 |
| 2015/0085746 A1* | 3/2015 | Somayazulu | H04W 48/08 | 370/328 |
| 2015/0111589 A1 | 4/2015 | Yavuz et al. | | |
| 2015/0208345 A1* | 7/2015 | Weissman | H04W 52/0209 | 455/574 |
| 2016/0112335 A1* | 4/2016 | Bouanen | H04L 47/2441 | 370/236 |
| 2017/0094515 A1* | 3/2017 | Salo | H04W 12/06 | |

\* cited by examiner

CALL ADMISSION CONTROL FOR RELAY ACCESS NODES

TECHNICAL BACKGROUND

As wireless networks evolve and grow, there are ongoing challenges in providing high-quality service to increasing numbers of wireless devices or user equipment (UE) in various coverage areas of a wireless network. One approach to improving service quality and coverage is to designate a UE as a relay node or relay UE for relaying communication between a base station or donor access node, and an end-user UE. Relay UEs may be used at the edge of a coverage area of a donor access node to improve coverage and/or service, as well as in crowded areas having a high number of other UEs to increase the available throughput to the UEs being relayed. However, relay UEs may be limited in their ability to effectively service UEs that are attached to it, particularly if the resources are limited from the donor access node providing the service.

Overview

Exemplary embodiments described herein include systems, methods, and nodes for. A method for call admission control in a relay access node includes monitoring a throughput of a backhaul connection between the relay access node and a donor access node. The donor access node provides access to network services. The method further includes determining a difference between the throughput of the backhaul connection and a throughput requirement of one or more user equipment (UEs) that are attempting to access the network services from the donor access node via the relay access node, and performing call admission control operations on at least one of said one or more UEs based on the difference.

A system for call admission control includes a relay access node configured to relay wireless services from a donor access node to one or more user equipment (UEs), and a processor communicatively coupled to the relay access node. The processor configures the relay access node to execute operations comprising continuously monitoring a difference between a throughput of a backhaul connection with the donor access node and a throughput requirement of the one or more UEs, and rejecting a connection request from an additional UE when the throughput requirement of the one or more UEs is greater than the throughput of the backhaul connection.

A processing node for performing call admission control in a wireless network includes a processor for enabling the processing node to perform operations. The operations include receiving a connection request from a user equipment (UE) to relay network services from a donor access node via a relay access node, comparing a backhaul throughput from the donor access node to the relay access node with a throughput requirement of one or more connected UEs that are connected to the relay access node, and performing call admission control operations on the UE based on the comparison

DETAILED DESCRIPTION

In embodiments disclosed herein, call admission controls performed at the relay access node include balancing the resources of the relay access node with the resources provided by the donor access node providing services to end UEs via the relay access node. The relay access node may be a relay UE coupled to a mini-macro access node. The relay UE is in wireless communication with a base station, while the mini-macro access node is in wireless communication with one or more end UEs. The relay UE dynamically determines a throughput of the wireless connection with the donor access node, i.e. its own backhaul connection. This throughput may vary dynamically as the donor access node also serves other end UEs directly, i.e. end UEs accessing services without connecting via the combination of the mini-macro access node coupled to the relay UE. Therefore, this calculation of the throughput of the backhaul connection may be determined as an average over a period of time, as further described herein. Further, this backhaul throughput is compared to a throughput requirement of the end UEs being served by the relay UE. This throughput requirement is also dynamic, as it may vary based on the usage requirements of the end UEs.

The comparison of the backhaul throughput and the throughput requirement can trigger specific operations for call admission at the relay UE. For instance, if the throughput requirement is larger than the backhaul throughput received from the donor access node, any new connection requests at the mini-macro access node from an additional end UE may be rejected. A threshold may be defined to ensure that there are ample resources at the backhaul prior to accepting connection requests from additional end UEs. Further, if the usage or throughput requirement of currently-connected end UEs increases, or if the backhaul throughput decreases beyond a threshold, then the relay access node may release one or more current connections by releasing the bearer for the connection. These and additional operations are further described with respect to the embodiments depicted in FIGS. 1-5 below.

Figure 1:
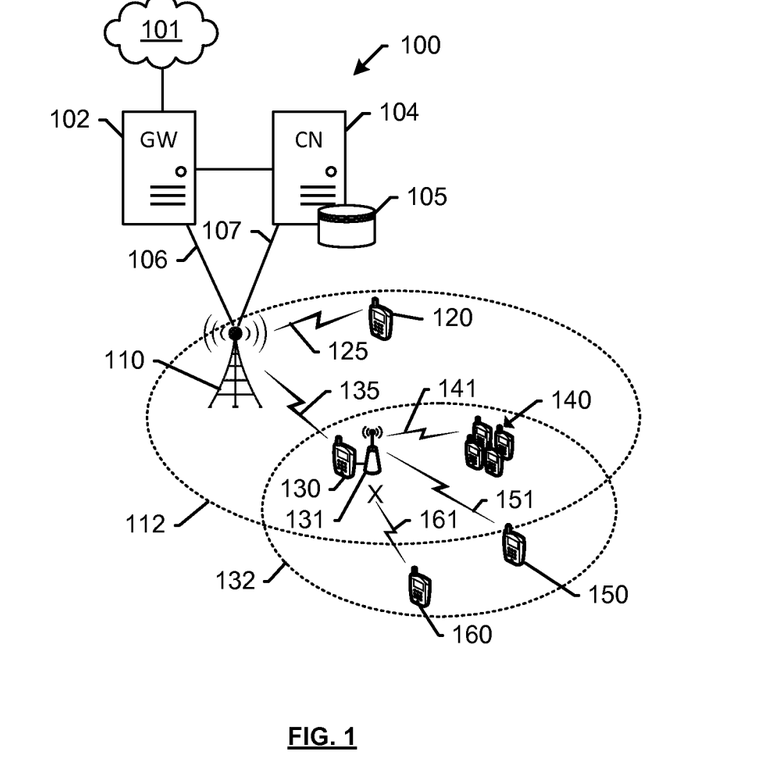
FIG. 1 depicts an exemplary system for call admission control.

FIG. 1 depicts an exemplary system 100 for call admission control. System 100 comprises a communication network 101, gateway 102, controller node 104, access node 110, and UEs 120, 130, 140, 150, and 160. Access node 110 is illustrated as having coverage area 112. UEs 120, 130, 140 are located within coverage area 112, with UEs 140 comprising a cluster of UEs concentrated within a small geographic area. UEs 150 and 160 are located outside coverage area 112. Access node 110 is illustrated as having established direct (i.e. unrelayed) communication with UEs 120 and 130 via communication links 125 and 135, respectively. Moreover, when a UE in communication with access node 110 is acting as a relay, such as relay UE 130, access node 110 may be referred to as a donor access node. In this embodiment, relay UE 130 relays services from access node 110 to UEs 140 and 150 via communication links 141 and 151, respectively. To achieve this, relay UE 130 may be communicatively coupled to a mini-macro base station/access node 131. Mini-macro access node 131 acts as a wireless access point for UEs 140, 150, while relay UE 130 connects wirelessly to access node 110. Mini-macro access node 131 has a wireless range 132, enabling end UEs 150 and 160 that are outside the range of donor access node 110 to access network services by virtue of being connected to relay UE 130 via mini-macro access node 131. In addition, several end UEs 140 clustered within a small geographic area may access network services using wireless communication links 141, rather than overload access node 110. It should be understood that wireless communication links 141 comprise a plurality of wireless communication links, each of which corresponds to each of the plurality of end UEs 140.

In operation, relay UE 130 dynamically determines a throughput of the wireless communication link 135 with the donor access node, i.e. its own backhaul connection. This throughput may vary dynamically as donor access node 110 also serves other end UEs directly, such as UE 120, via communication link 125. For example, donor access node 110 may perform load balancing operations by balancing a load between wireless communication links 125 and 135. In some embodiments, when relay UE 130 functions as a relay, relay UE 130 sends a message to donor access node 110 to indicate to donor access node 110 (and/or communication system 100) that UE 130 is functioning as a relay. In this manner, because donor access node 110 (and/or communication system 100) now knows that UE 130 is functioning as a relay on behalf of donor access node 110, donor access node 110 can alter how UE 130 is treated. For example, UE 130 may be provided with preferential treatment because it is functioning as a relay. Examples of preferential treatment can include, but are not limited to, increasing a scheduling weight for relay UE 130, setting one or more network parameters in order to give traffic associated with UE 130 better network performance than traffic associated with non-relaying UE 120, and so on. Network parameters may be configured to provide one or more of higher priority in scheduling resources, improved RF conditions, higher throughput, lower latency, etc. to UE 130 than is provided to non-relaying UE 120. In either case, the throughput offered by wireless communication link 135 is dynamically changing, and therefore needs to be monitored on an ongoing or periodic basis. In some embodiments, determination of the throughput of backhaul connection 135 may include a time average over a period of time, or at the same time each day for a period of days.

Relay UE 130 further compares this backhaul throughput to a throughput requirement of end UEs 140 and 150 being served by relay UE 130. The throughput requirement may also be dynamic, in that it varies based on the usage requirements of the connected end UEs. The comparison may also occur on a periodic or ongoing basis. In some embodiments, the comparison may be triggered by a connection request from UE 160 attempting to access services from the combination of relay UE 130 and mini-macro access point 131. In related embodiments, the throughput requirement may further include a bandwidth requirement or other characteristic of the connection request from end UE 160.

Based on the results of the comparison of the backhaul throughput and the throughput requirement, call admission operations may be performed by relay UE 130. For instance, if the throughput requirement of communication links 141, 151, and possibly 161, is larger than the backhaul throughput of communication link 135 from donor access node 110, any new connection requests such as wireless connection 161 from end UE 160 may be rejected. A threshold may be defined to ensure that there are ample resources at the backhaul prior to accepting connection requests from additional end UEs. Further, if the usage or throughput requirement of currently connected end UEs 140, 150 increases, or if the backhaul throughput of communication link 135 decreases beyond a threshold, then relay UE 130 may release one or more current connections 140, 150 by releasing the bearer for the connection.

In an embodiment, relay UE 130 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from donor access node 110 are amplified and transmitted by relay UE 130 to one or more of UEs 140, 150. Likewise, RF signals received from UEs 140, 150 are amplified and transmitted by relay UE 130 to donor access node 110. Alternatively or in addition, a layer 2 relay device performs a decode and forward (DF) function. RF signals received from donor access node 110 are demodulated and decoded, then encoded and modulated again before being transmitted by relay UE 130 to one or more of UEs 140, 150. Likewise, RF signals received from one or more of UEs 140, 150 are demodulated and decoded, then encoded and modulated again before being transmitted by relay UE 130 to donor access node 110. Alternatively or in addition, a layer 3 relay device also performs a decode and forward function. However, a layer 3 relay device also performs additional processing (such as ciphering and/or data concatenation/segmentation/resassembly) In other words, relay UE 130 performs demodulation and decoding of the received RF signals (either uplink or downlink), processes received data, then encodes, modulates, and transmits the data to one or more of UEs 140, 150.

UEs 120, 130, 140, 150, 160 may be any device, system, combination of devices, or other such communication platform capable of communicating wirelessly with donor access node 110 using one or more frequency bands deployed by donor access node 110. UEs 120, 130, 140, 150, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data via donor access node 110. Other types of communication platforms are possible.

Communication network 101 can be a wired and/or wireless communication network, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by UEs 120, 130, etc. Wireless network protocols can comprise MBMS, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107, may include Si communications links. Other wireless protocols can also be used. Communication links 106, 107 can be a direct link or might include various equipment, intermediate components, systems, and networks. Communication links 106, 107 may comprise many different signals sharing the same link Gateway node 102 can be any network node configured to interface with other network nodes using various protocols. Gateway node 102 can communicate user data over system 100. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway node 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 includes a database 105 for storing UE information, including which UEs are operating as relay UEs, such as relay UE 130. The software comprises computer programs, firmware, or some other form of machine-readable instructions, and may include an operating system, utilities, drivers, network interfaces, applications, or some other type of software, and combinations thereof. Controller node 107 can receive instructions and other input at a user interface.

Access node 110 can be any network node configured to provide communication between UEs 120, 130, and communication network 101. Access node 110 can be a standard access node and/or a short range, low power, small access node. A standard access node can be a macrocell access node such as a base transceiver station, a radio base station, an eNodeB device, or an enhanced eNodeB device, or the like. In an exemplary embodiment, a macrocell access node can have a coverage area 112 in the range of approximately five kilometers to thirty five kilometers and an output power in the tens of watts. A small access node can include a microcell access node, a picocell access node, a femtocell access node, or the like such as a home NodeB or a home eNodeB device. Moreover, it is noted that while access node 110 is illustrated in FIG. 1, any number of access nodes can be implemented within system 100.

Access nodes 110 can comprise a processor and associated circuitry to execute or direct the execution of computer-readable instructions to obtain information. Access nodes 110 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 110 can receive instructions and other input at a user interface. Access node 110 communicates with gateway node 102 and controller node 104 via communication links 106, 107.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access node 110 and communication network 101

Figure 2:
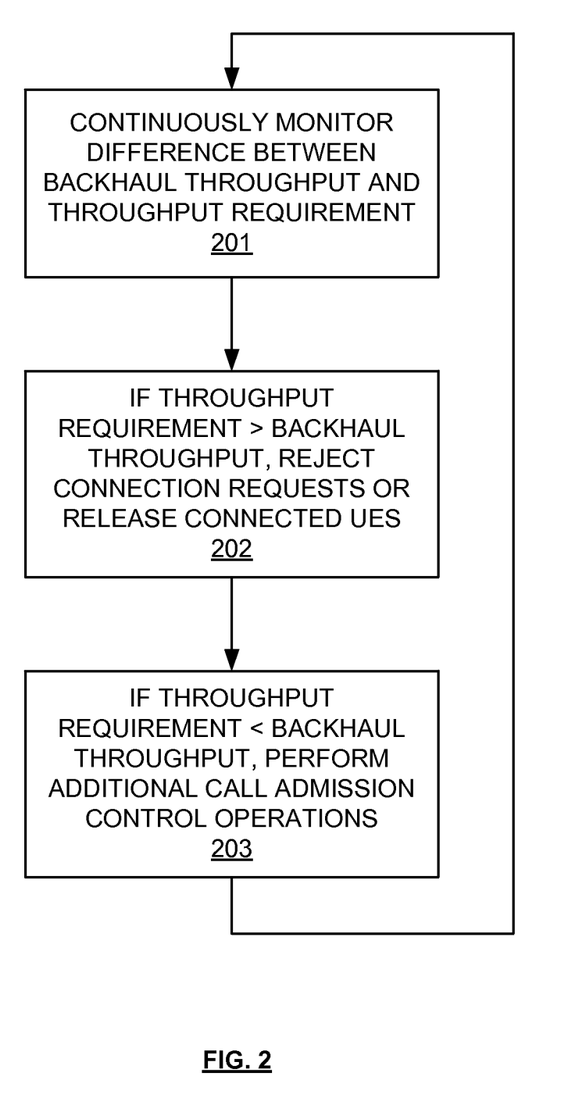
FIG. 2 depicts an exemplary method for call admission control.

FIG. 2 depicts an exemplary method for call admission control. The method will be discussed with reference to the exemplary communication system 100 illustrated in FIG. 1. However, the method can be implemented with any suitable communication system. In addition, although FIG. 2 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In 201, a relay UE, such as relay UE 130, monitors a difference between a backhaul throughput and a throughput requirement. This monitoring may be continuous, periodic, or triggered by a connection request from an additional UE attempting to access network resources from the relay UE. Since the backhaul link (i.e. the wireless connection between the relay UE and a donor access node) has a throughput that is dynamic, based on the donor access node's load, the relay UE must balance its own resources with the resources provided by the donor access node. Moreover, the calculation of the throughput of the backhaul connection may be determined as an average over a period of time. For example, a number of bytes transmitted over a period of time may be used as a metric for the backhaul throughput. This metric may be independent of any other load metric, or physical resource block (PRB) usage. The throughput may be measured for fixed times on a regular basis to determine a pattern of usage that may be stored and referred to for comparisons with subsequent throughput requirements, potentially triggered by future connection requests. Similarly, the throughput requirement of the end UEs being served by the relay UE is also dynamic, as it may vary based on the usage requirements of the end UEs.

In 202, a difference between the backhaul throughput and the throughput requirement is used to determine whether or not to trigger specific operations for call admission at the relay UE. For instance, if the throughput requirement is larger than the backhaul throughput received from the donor access node, any new connection requests at the mini-macro access node from an additional end UE may be rejected. A threshold may be defined to ensure that there are ample resources at the backhaul prior to accepting connection requests from additional end UEs. For example, the throughput requirement must be larger than a throughput received from the donor access node plus a threshold in order to reject a connection request from a new end UE. The rejection may include rejecting a handover request of an additional end UE from a neighboring access node. In some embodiments, without any new connection requests, the usage or throughput requirement of currently-connected end UEs can increase, or the backhaul throughput can decrease. In these cases, the relay access node may release one or more current connections by releasing the bearer for the connection. Thresholds may be used to determine whether or not to release the bearer for the connection, similar to the thresholds used to determine whether to reject new connections.

Moreover, the bearers may be released based on Allocation and Retention Priority characteristics (ARP) that is a QoS parameter comprising information about the priority level, the pre-emption capability and the pre-emption vulnerability of a resource request. These parameters enable making a decision to accept or reject a bearer request due to resource limitations. For example, the priority level defines the relative importance of a resource request, which enables determining whether a bearer establishment or modification request can be accepted or needs to be rejected in case of resource limitations, or to decide which existing bearers to pre-empt during resource limitations. The range of the ARP priority level is 1 to 15 with 1 as the highest level of priority. The pre-emption capability information defines whether a service data flow can get resources that were already assigned to another service data flow with a lower priority level. The pre-emption vulnerability information defines whether a service data flow can lose the resources assigned to it in order to admit a service data flow with higher priority level. A UE that submits a bearer request with a high priority level may be referred to as a privileged UE.

In 203, if the throughput requirement is smaller than the throughput received from the donor access node, the connection request may be accepted, subject to additional call admission control operations that would otherwise be performed on any connection requests that were not subject to a throughput constrained as identified in step 202. A second threshold may be defined, such that the throughput requirement must be smaller than the backhaul throughput minus a predefined threshold in order to accept the connection request. A separate threshold may be defined for higher priority end UEs, such as those initiating an emergency communication. The separate threshold may be lower than the first threshold, enabling emergency requests to be accepted. In some embodiments, the separate threshold may be higher than the first threshold, if it is determined that insufficient resources may be available to properly execute an emergency call. Further, an ARP priority level may by referred to for an indication of an emergency communication.

Figure 3:
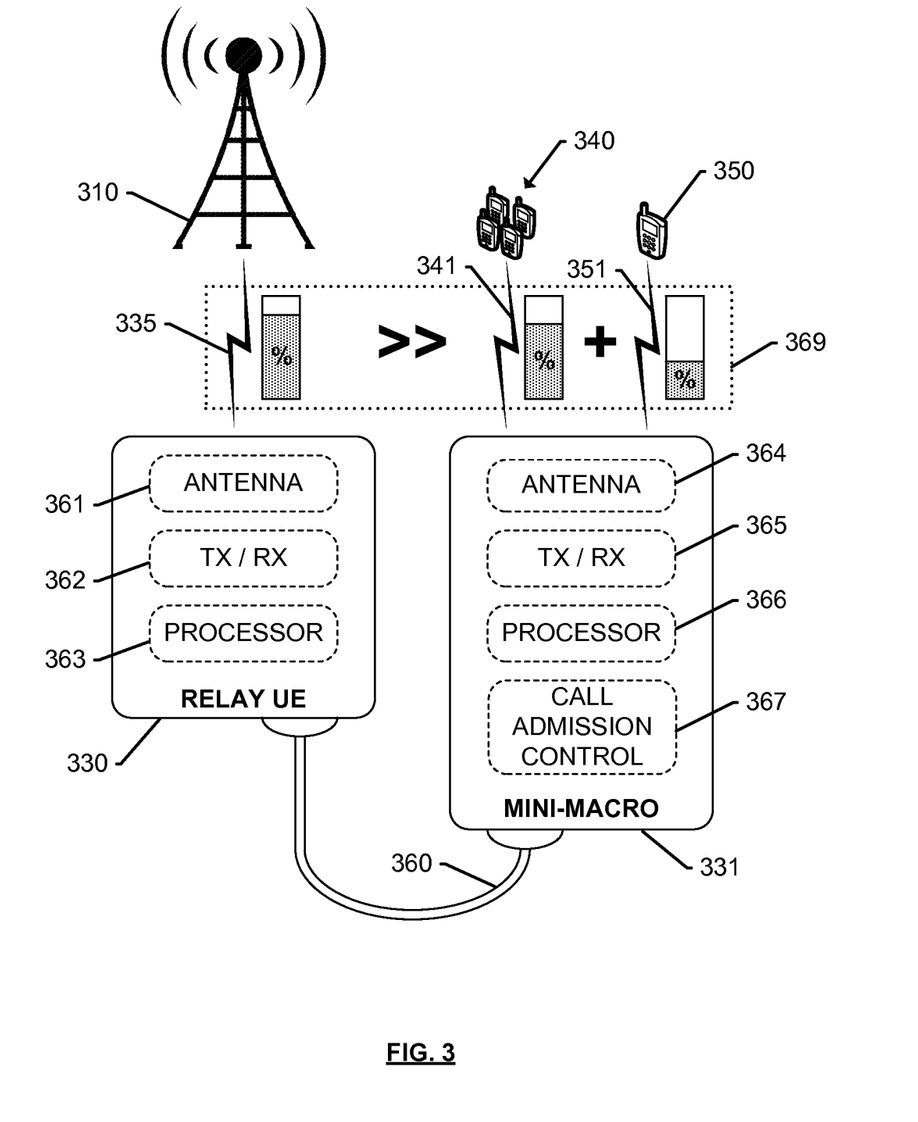
FIG. 3 depicts an exemplary relay access node for performing call admission control.

FIG. 3 depicts an exemplary relay access node 330 and mini-macro 331 for performing call admission control. Relay UE 330 is illustrated as comprising an antenna 361 for direct (i.e. unrelayed) communication with donor access node 310 via communication link 335, a transceiver 362, and a processor 363. Further, relay UE 330 is coupled to mini-macro base station or access point 331 via a communication interface 360. Communication interface 360 may be any interface that enables direct communication between relay UE 330 and mini-macro 331, such as USB, FireWire, or any other serial, parallel, analog, or digital interface. Mini-macro access node 331 is illustrated as comprising an antenna 364 for wireless communication with end UEs 340 and 350 via communication links 341 and 351 respectively, a transceiver 365, a processor 366, and a call admission control module 364 for enabling relay mini-macro access node 331 to perform call admission control operations described herein. Although only one transceiver is depicted in each of relay UE 330 and mini-macro access node 331, additional transceivers may be incorporated in order to facilitate communication across interface 360 and other network elements. Further, it should be understood that communications links 341 comprise a plurality of communication links, each of which corresponds to each of the plurality of UEs 340.

In operation, relay UE 330 relays network services from donor access node 110 to UEs 340 and/or 350 via mini-macro access node 331. Relay UE 330 may begin to function as a relay UE by sending a message to donor access node 310 to indicate to donor access node 310 that UE 330 is functioning as a relay UE. Donor access node 310 may consequently alter how UE 330 is treated. For example, relay UE 330 may be provided with preferential treatment because it is functioning as a relay. In some embodiments, UE 330 can request to send a buffer status report to donor access node 310. Donor access node 310 can grant this request in a conventional manner. Relay UE 330 may respond to the grant by sending a short buffer status report. This short buffer status report is associated with a logical channel group that indicates the buffer status report is communicating the status of the UE as a relay, and thus is not asking for additional resource allocations (like a 'conventional' buffer status report would indicate). In other words, when a UE responds with a buffer status report for the 'special' logical channel group, it means that the buffer status report is not actually reporting the status of a buffer. Rather, this buffer status report indicates that the UE is now functioning as a relay.

Once status of relay UE 330 is established, mini-macro access node 331 can start accepting connection requests from one or more of end UEs 340, 350. For example, end UEs 340 may be a dense cluster of UEs that would place an unreasonably high load on donor access node 310, if directly connected. Therefore, end UEs 340 may instead connect to mini-macro access node 331 and receive network services relayed using relay UE 330 via plurality of network connections 341. As described herein, call admission module 367 monitors a difference between a throughput of communication link 335 with donor access node 310, i.e. its own backhaul connection, and a throughput one or more of connections 341, 351, i.e. a throughput requirement. Moreover, if a connection request is received from an additional end UE, such as end UE 350, a call admission operation may be triggered. Briefly, an exemplary call admission operation may be outlined by box 369, which depicts a comparison of a throughput of communication link 335 with a throughput requirement of communication links 341 and 351. To admit or allow additional connection request from end UE 350, call admission control module 364 must determine that the throughput of communication link 335 is greater than throughput requirements of communication links 341 and 351, in order to allow the connection request. The throughput of the backhaul connection 335 may be larger by a threshold, in order to ensure that there are ample resources at the backhaul prior to accepting connection requests from additional end UE 350.

Figure 4:
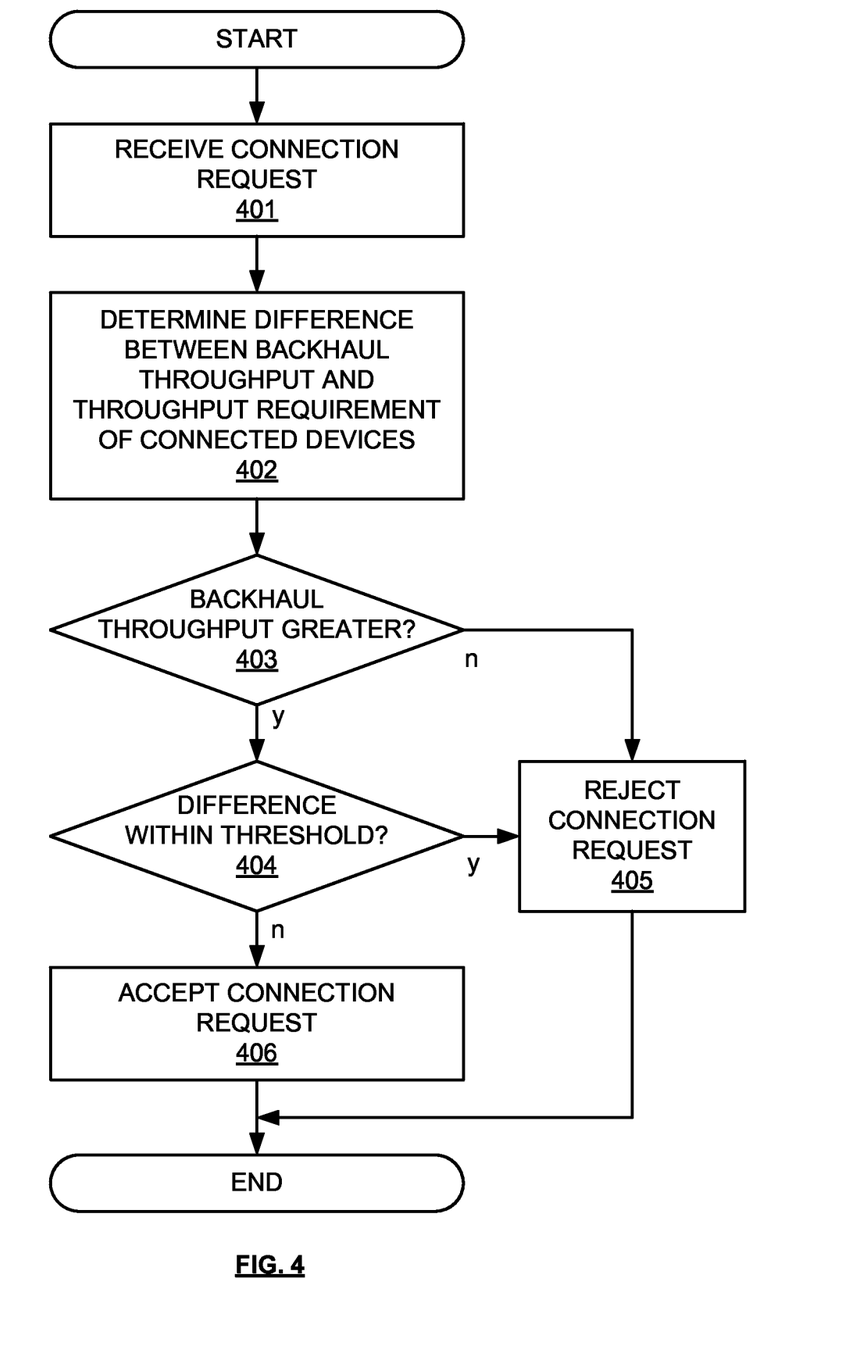
FIG. 4 depicts an exemplary method for call admission control in a relay access node.

FIG. 4 depicts an exemplary method for call admission control in a relay access node. The method will be discussed with reference to the combination of relay UE 330 and mini-macro 331. However, the method can be implemented with any suitable network element. In addition, although FIG. 4 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined, and/or adapted in various ways.

In 401, a connection request may be received at a relay UE, such as relay UE 330, from an additional end UE, such as end UE 350. The connection request may be directly initiated by the end UE, for instance as the end UE resumes from an idle state or attempts to make a telephone call or access a network service via an application executed on the end UE. In some embodiments, the connection request may include a handover request of the end UE from a neighboring access node. In either case, a mini-macro determines a difference between a backhaul throughput and a throughput requirement. The throughput requirement may be of devices already connected to the relay UE, or may include the throughput requirement of the end UE. For instance, the throughput requirement of the end UE may be determined by a type of application being executed or service requested.

In 403, the difference between the backhaul throughput and the throughput requirement calculated in 402 is used to determine whether or not to trigger specific operations for call admission. For instance, if it is determined that the throughput requirement is greater than the backhaul throughput received from the donor access node, the new connection request is rejected at 405. This is based on the logic that a donor access node would be unable to provide network services for requirements to UEs that require higher throughput that the donor access is currently offering.

However, if the backhaul throughput is greater than the throughput requirement as determined in 403, this does not automatically grant the connection request. As described herein, a threshold may be defined to ensure that there are ample resources at the backhaul prior to accepting connection requests from additional end UEs. This determination in 404 ensures that the difference between the throughput requirement of end UEs and the backhaul throughput exceeds a threshold, allowing for a "cushion" to accept new requests. If the threshold is not exceeded, then the connection request is rejected 405. The rejection may include rejecting a handover request of an additional end UE from a neighboring access node. If the difference exceeds the threshold, then in 404, the connection request may be accepted, subject to additional call admission control operations that may need to be performed.

The embodiments depicted in FIGS. 3-4 describe a call admission control module within a mini-macro base station that is communicatively coupled to a relay wireless device. In some embodiments, the relay wireless device may incorporate the functionality of the call admission control module. In some embodiments, the relay wireless device and the mini-macro may be incorporated within the same device, for instance using a plurality of different transceivers. Generally, the backhaul connection with the donor access node is of a different frequency than the connection with the end-user wireless devices. However, in some embodiments, the connections may use the same frequency band. Other configurations of these embodiments may be evident to those having ordinary skill in the art in light of this disclosure.

Moreover, the methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: access nodes 110, 310, UEs 130, 330, mini-macros 131, 331, and/or network 101.

Figure 5:
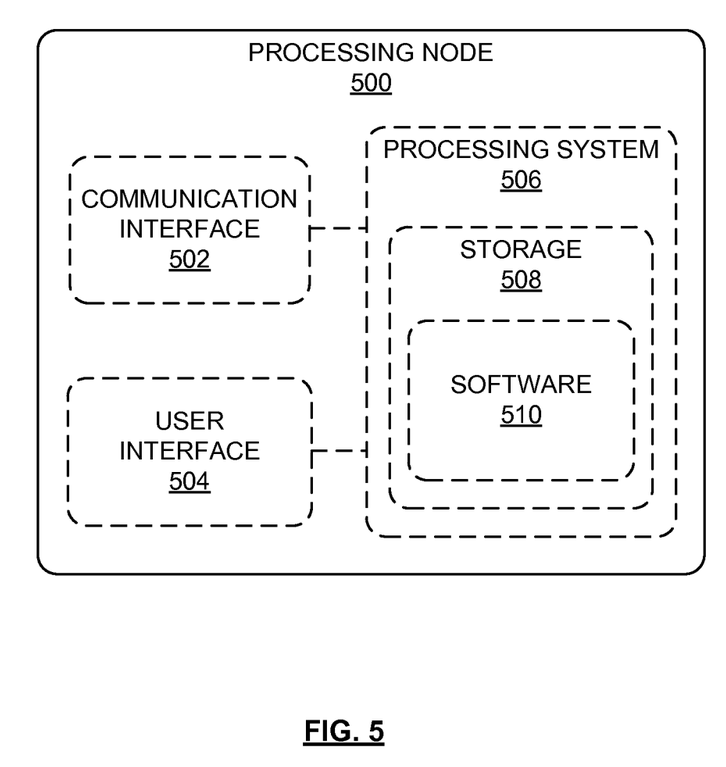
FIG. 5 depicts an exemplary processing node.

FIG. 5 depicts an exemplary processing node 500 comprising communication interface 502, user interface 504, and processing system 506 in communication with communication interface 502 and user interface 504. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. For example, storage 508 may include a buffer. Software 510 may include computer programs, firmware, or some other form of machine-readable instructions, including an operating system, utilities, drivers, network interfaces, applications, or some other type of software. For example, software 510 may include a call admission control module. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for call admission control in a relay access node, the method comprising:
   monitoring a throughput of a backhaul connection between the relay access node and a donor access node, wherein the donor access node provides access to network services;
   defining a first threshold amount to be added to a throughput requirement of one or more user equipment (UEs) that are attempting to access the network services from the donor access node via the relay access node;
   receiving a connection request from a high-priority UE;
   defining a second threshold amount for the throughput requirement of the high-priority UE for the connection request, the second threshold amount being smaller than the first threshold amount;
   upon determining that the throughput requirement of the high-priority UE plus the second threshold amount is greater than the throughput of the backhaul connection, rejecting the connection request; and
   upon determining that the throughput requirement of the high-priority UE plus the second threshold amount is less than the throughput of the backhaul connection, accepting the connection request.

2. The method of claim 1, wherein the call admission control operations comprise rejecting a handover request from a neighboring access node when the throughput of the backhaul connection is larger than the throughput requirement of the one or more UEs.

3. The method of claim 1, wherein the call admission control operations comprise releasing one or more bearers from at least one of said one or more UEs when the throughput requirement of said one or more UEs is greater than the throughput of the backhaul connection by the first threshold amount.

4. The method of claim 1, wherein monitoring the throughput of the backhaul connection further comprises monitoring an average throughput of the backhaul connection over a time period.

5. The method of claim 4, wherein monitoring the average throughput further comprises measuring the throughput of the backhaul connection at a fixed time every day for a plurality of days.

6. The method of claim 1, further comprising determining that the access node has insufficient resources for the connection request and adjusting the second threshold amount to be higher than the first threshold amount.

7. The method of claim 1, further comprising:
   receiving a second connection request from a second UE that is not a high-priority UE;
   upon determining that the throughput requirement of the second UE plus the first threshold amount is greater than the throughput of the backhaul connection, rejecting the second connection request; and
   upon determining that the throughput requirement of the second UE plus the first threshold amount is less than the throughput of the backhaul connection, accepting the second connection request.

8. A system for call admission control, the system comprising:
   a relay access node configured to relay wireless services from a donor access node to one or more user equipment (UEs); and
   a processor communicatively coupled to the relay access node, the processor for configuring the relay access node to execute operations comprising:
   continuously monitoring a difference between a throughput of a backhaul connection with the donor access node and a throughput requirement of the one or more UEs;
   defining a first threshold amount to be added to the throughput requirement of the one or more UEs attempting to access network services from the donor access node via the relay access node;
   receiving a connection request from a high-priority UE;
   defining a second threshold amount to be added to the throughput requirement of the high-priority UE to make the emergency call, the second threshold amount being smaller than the first threshold amount;
   upon determining that the throughput requirement of the high-priority UE plus the second threshold amount is greater than the throughput of the backhaul connection; rejecting the connection request; and
   upon determining that the throughput requirement of the first UE plus the second threshold amount is less than the throughput of the backhaul connection, accepting the connection request.

9. The system of claim 8, further comprising a mini-macro base station communicatively coupled to the relay access node.

10. The system of claim 9, wherein the one or more UEs connect wirelessly to the mini-macro base station.

11. The system of claim 8, wherein the connection request comprises a handover request from a neighboring access node.

\* \* \* \* \*